United States Patent [19]

Wood et al.

[11] Patent Number: 4,722,945

[45] Date of Patent: Feb. 2, 1988

[54] FLAME-RETARDANT LATEX FOAMS

[75] Inventors: Kenneth Wood, Bradford, England; Raymond W. H. Bell, Crickhowell, Wales

[73] Assignee: Dunlop Limited, London, England

[21] Appl. No.: 45,430

[22] Filed: May 4, 1987

[30] Foreign Application Priority Data

May 13, 1986 [GB] United Kingdom ............... 8611671

[51] Int. Cl.$^4$ ................................................. C08J 9/28
[52] U.S. Cl. ........................................ 521/65; 521/54; 521/82; 521/84.1; 521/85; 521/92; 521/95; 521/907
[58] Field of Search .............. 521/65, 82, 84.1, 85, 521/54, 907, 92, 95

[56] References Cited

U.S. PATENT DOCUMENTS

| | | |
|---|---|---|
| 3,574,644 | 4/1971 | Olstowski et al. |
| 3,975,200 | 8/1976 | Takashima ................. 524/496 |
| 4,151,126 | 4/1979 | Adelman et al. ............ 523/220 |
| 4,529,742 | 7/1985 | Von Bonin et al. ......... 523/179 |
| 4,530,949 | 7/1985 | Atkinson et al. ........... 523/512 |

FOREIGN PATENT DOCUMENTS

2428307 1/1976 Fed. Rep. of Germany.
2168706A 6/1986 United Kingdom.

OTHER PUBLICATIONS

United Kingdom Search Report.
EPO Search Report.

*Primary Examiner*—Morton Foelak
*Attorney, Agent, or Firm*—Stevens, Davis, Miller & Mosher

[57] ABSTRACT

A flame-retardant latex foam contains at least 35 (and preferably 40 to 55) parts by weight of an expandable graphite per hundred parts by weight of latex. Additional flame-retardant materials (e.g. hydrated aluminas, magnesium hydroxide, compounds of halogen and/or phosphorus, boron compounds, antimony oxides or melamine) can be included in the foam formulation, as can fillers or intumescent agents. The expandable graphite contains one or more exfoliating agents such that considerable expansion will occur at high temperatures. Foams according to the present invention satisfy the conditions of British Standard Specification Nos. 5852; Part 2; 1982 and 4735; 1974.

6 Claims, No Drawings

FLAME-RETARDANT LATEX FOAMS

This invention relates to a method for the production of flame-retardant latex foams and to foams obtained thereby.

Most industrialised countries have introduced legislation which requires a minimum level of flame-retardance in foam products. In many countries, such legislation is periodically reviewed and made increasingly stringent. Thus, there is an ongoing need for improvement in the production of flame-retardant foams.

The assignee's co-pending UK published patent Application No. GB-A-2168706 describes the production of flame-retardant poly-urethane foams by the inclusion of expandable (as hereinafter defined) graphite in the foam formulation. While polyurethane foams are widely accepted in the manufacture of upholstery components and mattresses, latex foams are considered by many users to be more desirable on account of their different load/deflection characteristics and their "traditional" appeal.

Latex foams are much more difficult to render self-extinguishing then polyurethane foams and it might, therefore, be expected that they would require markedly different flame-retardant treatment.

However, we have surprisingly found that satisfactory flame-retardant latex foams may, according to the present invention, be obtained by including the foam formulation expandable (as hereinafter defined) graphite.

Accordingly, the present invention provides a method for the production of a flame-retardant latex foam in which the foam formulation includes expandable (as hereinafter defined) graphite.

The present invention also provides a flame-retardant latex foam made by the method described in the immediately-preceding paragraph.

By "expandable" graphite is meant graphite containing one or more exfoliating agents such that considerable expansion will occur at high temperatures.

According to a preferred embodiment of the present invention, the latex foam formulation contains at least 35 (and preferably 40 to 55) parts by weight of expandable graphite per hundred parts by weight of latex.

The expandable graphite may comprise the sole flame-retardant additive in the latex foam formulation.

Alternatively, other flame-retardant materials can be used in addition to the graphite, for example hydrated aluminas, magnesium hydroxide, halogen and/or phosphorus-containing compounds, boron compounds, antimonyoxides or melamine.

If desired, fillers (e.g. magnesium carbonate, calcium carbonate or aluminium silicate) and intumescent agents (e.g. ammonium polyphosphates) can also be included in the foam formulations.

Latex foams according to the present invention can be made from natural rubber latex or synthetic rubber latices such as those of styrene/butadiene, polyisoprene, polybutadiene, polychlorobutadiene or of butadiene/acrylonitrile copolymers. Mixtures of latices can also be used.

The present invention will be illustrated by way of the following Examples:

EXAMPLE 1

A sample of moulded latex foam, made from the formulation shown in TABLE A (below), was tested according to the method described in British Standard Specification No. 4735: 1974 (Laboratory test method for the assessment of the horizontal burning characteristics of cellular plastics and cellular rubber materials when subjected to a small flame).

The foam was self-extinguishing, with a mean burn length of 40 mm and an average burn time of 300 seconds.

An identical sample of the same foam was tested according to the method described in British Standard Specification No. 5852; Part 2, 1982 (Fire tests for furniture; Part 2) in combination with a woollen fabric of approximate weight 400 g.m$^{-2}$ and using a No. 5 crib as the ignition source Flaming combustion ceased in 5 minutes from the ignition of the crib.

TABLE A

| Note (see below) | Ingredient | Parts by wt |
| --- | --- | --- |
| (a) | Synthetic rubber latex | 90 |
| | Natural rubber latex | 10 |
| | Potassium oleate | 1 |
| (b) | Antioxidant | 0.5 |
| | Sodium Hydroxide | 0.07 |
| | Zinc oxide | 3 |
| | Sulphur | 2.5 |
| | Zinc dithiocarbamate | 1 |
| | Zinc mercaptobenzthiazole | 1 |
| | Diphenylguanidine | 0.5 |
| (c) | Gelling Agent | 2 |
| (d) | Graphite flame-retardant | 40 |
| (e) | Additional flame-retardant | 10 |

Notes to TABLE A
(a) A styrene/butadiene latex available from Polysar. as CIAGO H. 2133.
(b) A styrenated -phenol-type material available from Bayer Chemicals as VULKANOX.
(c) Sodium silicofluoride.
(d) An expandable graphite available from FOSECO. as ZC90.
(e) Alumina hydrate, available from the British Aluminium Co as BACO FRF20.
(CIAGO, VULKANOX and BACO are Registered Trade Marks).

EXAMPLE 2

A block foam sample, made from the formulation shown in TABLE B (below), was tested according to the method described in the aforesaid B.S.S. No. 4735: 1974.

The foam was self-extinguishing, with a mean burn length of 85 mm and an average burn time of 210 seconds.

An identical sample of the same foam was tested according to the method described in the aforesaid B.S.S. No. 5852; part 2, 1982 in combination with the woollen fabric of EXAMPLE 1 (above) and using a No. 4 crib as the ignition source. Flaming combustion ceased in 6 minutes from the ignition of the crib.

TABLE B

| Note (see below) | Ingredient | Parts by wt. |
| --- | --- | --- |
| (a) | Synthetic latex | 80 |
| | Natural rubber latex | 20 |
| | Potassium oleate | 1 |
| | Ammonium ricinoleate | 3 |
| (b) | Antioxidant | 2 |
| | Zinc oxide | 4 |
| | Sulphur | 3 |
| | Zinc dithiocarbamate | 1.25 |
| | Mercaptobenthiazole | 1.25 |
| | Ammonia | 0.8 |
| (c) | Sodium lauryl sulphate | 0.25 |
| (d) | Thickening agent | 0.2 |
| (e) | Graphite flame-retardant | 40 |

TABLE B-continued

| Note (see below) | Ingredient | Parts by wt. |
| --- | --- | --- |
| (f) | Additional flame retardant | 0.1 |

Notes to TABLE B
(a) CIAGO B.2133 (see notes to TABLE A)
(b) VULKANOX (see notes to TABLE A)
(c) Available from Albright & Wilson as EMPICOL LX 28
(d) A polyacrylate material, available from Allied Colloids as HUGEL.
(e) Sodium hexametaphosphate, available from Ellis and Emmanuel Chemicals Ltd as CALGON. (CIAGO, VULKANOX, EMPICOL, HUGEL and CALGON are Registered Trade Marks).

We claim:

1. A flame-retardant latex foam made from a foam formulation including a latex selected from the group consisting of natural rubber latex, synthetic rubber latices and mixtures thereof, together with an effective amount of an expandable graphite containing exfoliating agents, said effective amount being at least 35 parts by weight per 100 parts by weight latex.

2. The foam of claim 1, wherein said effective amount of expandable graphite is from 40 to 55 parts by weight per 100 parts by weight of said latex.

3. The foam of claim 1, wherein said foam formulation also includes at lease one flame-retardant substance selected from the group consisting of hydrated aluminas, magnesium hydroxide, compounds containing halogen and/or phosphorous, antimony oxides, boron compounds and melamine.

4. The foam of claim 1, wherein said foam formulation also includes a filter selected from the group consisting of magnesium carbonate, calcium carbonate and aluminium silicate.

5. The foam of claim 1, wherein said foam formulation also includes an intumescent agent.

6. The foam of claim 5, wherein said intumescent agent is an ammonium polyphosphate.

* * * * *